United States Patent [19]

Dosaka

[11] Patent Number: 5,175,644
[45] Date of Patent: Dec. 29, 1992

[54] MICROSCOPE APPARATUS

[75] Inventor: Shinichi Dosaka, Tsukui, Japan

[73] Assignee: Olympus Optical Co., Ltd., Tokyo, Japan

[21] Appl. No.: 659,508

[22] Filed: Feb. 22, 1991

[30] Foreign Application Priority Data

Feb. 23, 1990 [JP] Japan .................................. 2-43536

[51] Int. Cl.⁵ ........................ G02B 21/00; G02B 21/08
[52] U.S. Cl. .................................. 359/392; 359/385; 359/368
[58] Field of Search ............... 350/530, 526, 523, 521, 350/507; 359/392, 388, 385, 383, 368

[56] References Cited

U.S. PATENT DOCUMENTS

| | | | |
|---|---|---|---|
| 3,551,019 | 12/1970 | Michel | 350/526 |
| 4,148,552 | 4/1979 | Suzuki et al. | 350/526 |
| 4,299,440 | 11/1981 | Hodgson | 350/530 |

FOREIGN PATENT DOCUMENTS

| | | | |
|---|---|---|---|
| 867171 | 2/1953 | Fed. Rep. of Germany | 350/530 |
| 320017 | 7/1932 | Italy | 350/530 |
| 34535 | 3/1978 | Japan | 350/530 |
| 462495 | 10/1968 | Switzerland | 350/507 |
| 2204963 | 11/1988 | United Kingdom | 350/523 |

Primary Examiner—Jon W. Henry
Attorney, Agent, or Firm—Stevens, Davis, Miller & Mosher

[57] ABSTRACT

A microscope apparatus in which an arm and a focusing adjustment are arranged to be detachable with respect to a foot base to make possible to change the length of the arm from an optical axis of an objective provided in the arm and an inner surface of a stand portion of the arm; a height of the arm; a stiffness of the focusing adjustment. In the apparatus according to the invention, since the arm having a different length or a different height and the focusing adjustment having a different stiffness can be selectively adapted to the foot base, it is possible to examine by one apparatus specimens having different dimensions.

18 Claims, 6 Drawing Sheets

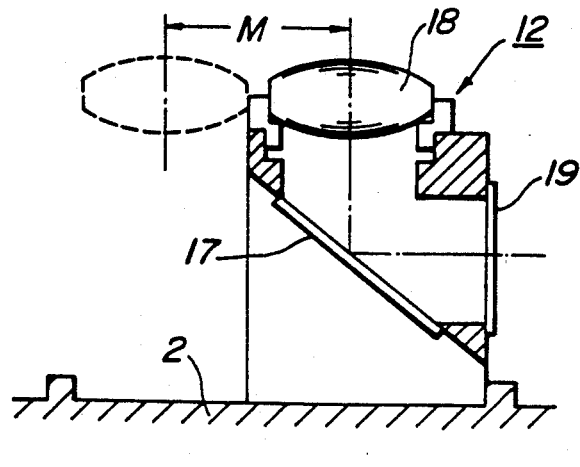
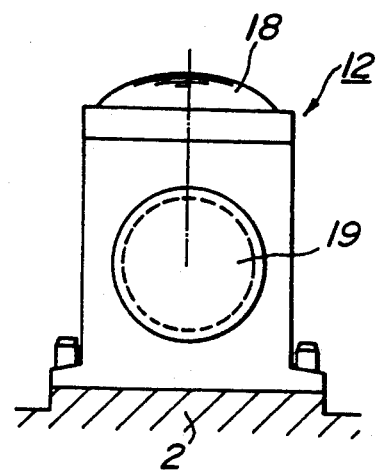
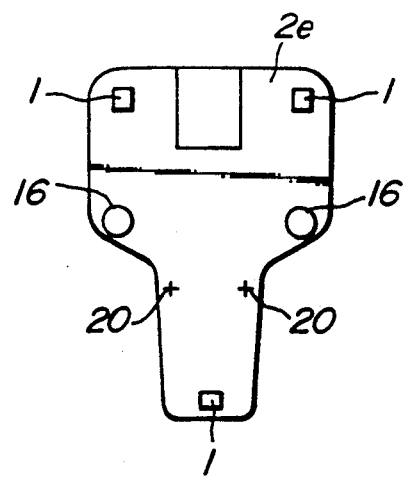

MICROSCOPE APPARATUS

BACKGROUND OF THE INVENTION

1) Field of the Invention

The present invention is relates to a microscope apparatus, particularly, to a microscope apparatus for use in an industrial examination of semiconductor elements, such as semiconductor wafers, or liquid crystal elements, such as liquid crystal panels.

2) Prior Art Statement

In a process for producing semiconductor chips, recently, there is a tendency to use large wafers in order to increase a producing efficiency, because the larger the dimension of the semiconductor wafers, the more semiconductor chips can be produced. Wafers having a diameter of 6 inches are now mainly used in the semiconductor industry, however, 8 inch wafers or 10 inch wafers will certainly be widely used in the near future.

On the other hand, the applicable field of liquid crystal elements has increased in large display panels, which are used for word processors or televisions.

For the purpose of quality control of these elements, the microscope is used to examine these elements. When examining these large size elements with the aid of the microscope, the elements, i.e. the large semiconductor wafers or the large liquid crystal display panels, which have not been divided into each chip or each liquid crystal display element yet, should be held on a stage of the microscope. Therefore, it is required that the microscope apparatus comprises a large stage range; and thus an arm of the apparatus should have a large bent part in a stand portion thereof. In such microscope apparatuses, it is further required that the arm and a focusing adjustment of each apparatus should be very stiff, because the arm has a large bent part and the large and heavy specimen is held on the stage.

However, sizes and weights of these semiconductor wafers or liquid crystal panels are different according to manufacturer, and the microscope apparatuses for use in examining these wafers or panels also have different sizes and weights. On the other hand, mechanical dimension, stiffness, operational efficiency, etc. are different in each microscope. Therefore, it was strongly demanded to conduct the microscopic examination of the products in a stable manner without being influenced by the difference in size and weight of the products and mechanical dimension, stiffness, operational efficiency of the microscope apparatuses. However, there has to date not been a microscope meeting such requirements.

SUMMARY OF THE INVENTION

The present invention has for its object to provide a microscope apparatus by which microscopic examination of specimens having different sizes and/or different weights can be conducted in a stable manner by only one microscope apparatus by selectively adapting detachably arranged arms and focusing adjustments and a foot base.

In order to carry out the object, the microscope according to the present invention, comprises:

a foot base;
a tube;
a stage for holding a specimen to be examined;
arms for holding said tube being arranged to be detachable with respect to said foot base;
focusing adjustment for holding said stage being arranged to be detachable with respect to said foot base;
an objective being held in said tube;
an eyepiece being arranged on said arm; and
an optical system for introducing a light into a specimen to be examined;
anyone of said arms and anyone of said focusing adjustments is selectively used in accordance with the type of said specimen to be examined.

In the microscope apparatus according to the invention, the arms having different heights and different sizes in the bent parts thereof and the focusing adjustments having different stiffnesses are arranged to be detachable, and any one of the arms and any one of the focusing adjustments can be selectively used in accordance with the size and weight of the specimen to be examined thereby. Therefore different kinds of specimens in dimension, i.e. size and weight, can be examined by only one microscope apparatus.

BRIEF DESCRIPTION OF THE DRAWINGS

FIGS. 5A and 5B are partial schematic views showing an optical means equipped in the base of the microscope according to the invention;

FIG. 6 is a schematic view depicting a bottom surface of the base of the microscope according to the invention;

DETAILED EXPLANATION OF THE PREFERRED EMBODIMENTS

Figure 1A:
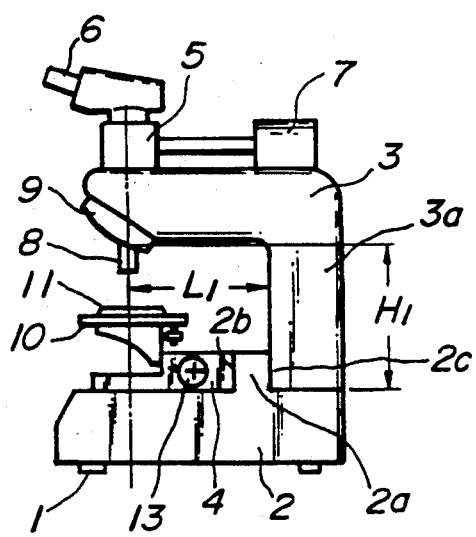
FIG. 1A is a side schematic view showing a first embodiment of microscope according to the invention.
Figure 1B:
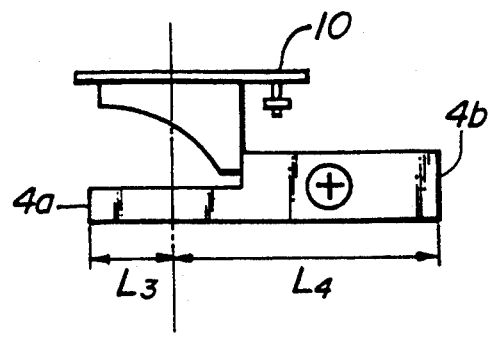
FIG. 1B is a partial schematic view illustrating a focusing adjustment of the microscope shown in FIG. 1A.

FIG. 1A is a schematic view showing a first embodiment of the microscope apparatus according to the present invention. The microscope apparatus comprises a foot base 2, on a bottom surface of which there are provided a plurality of shock absorbing members 1 for absorbing vibration and preventing slipping of the microscope apparatus. The foot base 2 comprises a projected portion 2a comprising front and back side surfaces 2b and 2c, which are opposite each other. On the foot base 2, are provided an arm 3 and a focusing adjustment 4, as shown in FIG. 1. The front surface 2b of the projected portion 2a serves as a first standard surface for adapting the focusing adjustment 4 to the foot base 2; and the back surface 2c a second standard surface for adapting the arm 3 to the foot base 2. Therefore, when adapting the focusing adjustment 4 to the foot base 2, the back surface 4b of the focusing adjustment 4 is urged against the front surface 2b of the projected portion 2a; and when adapting the arm 3 to the foot base 2 a lower part of an inner surface of the arm 3 is made to contact with the back surface 2c of the projected portion 2a. It should be noted that the focusing adjustment 4 is arranged to be able to change its direction by 180 degrees in a longitudinal direction of the foot base 2. In case that the direction of the focusing adjustment 4 is changed, the front surface 4a of the focusing adjustment is urged against the front side surface 2b of the projected portion 2a.

The arm 3 has an L-shaped body as viewed from the sides: on a head portion of said L-shaped body of the arm, the eyepiece 6 and a lamp house 7 are provided via an intermediate tube 5; and on a stage side of a top end portion of the arm 3 is provided a revolving nosepiece 9, in which the objective 8 is arranged. The eyepiece 6, the intermediate tube 5, the light house 7 and the objective 8 constitute an optical system for observing a specimen 11 held on a stage 10.

On the focusing adjustment 4, is arranged the stage 10, being movable in upper and lower directions by adjusting the focusing adjustment 4 in order to change the distance between the objective 8 and the stage 10. The focusing adjustment 4 comprises a knob 13; and the distance can be adjusted thereby.

It should be noted that the microscope apparatus having an L-shaped arm or a convex-shaped arm is generally called a C-shaped microscope; and in this specification, a length L1 represents a distance between an optical axis of the objective 8 and an inner surface of a stand portion 3a of the arm 3 and a height H1 represents a distance between an upper surface of the foot base 2 and a position where the objective 8 is provided.

The arm 3 and the focusing adjustment 4 are arranged to be detachable with respect to the foot base 2, so that it is possible to selectively use an arm having a large length L1 and/or a large height H1 in accordance with the size of the specimen to be examined; and when it is required to examine the specimen with the aid of a special large objective or a special optical measurement system, it is possible to selectively use the arm which is applicable to the special objective or the special optical measurement system. Further, when examining a heavy specimen, it is possible to selectively use a focusing adjustment having a large stiffness. In such case, a focusing adjustment 4 which comprises an adjusting spring having a larger capacity for holding the stage 10 is selectively used, so as not to directly weigh the weight of the stage, on which a heavy specimen is held, to gears of the focusing adjustment. It should be noted that it is generally desired that when the capacity of the adjustment spring is subtracted from a sum of the weight of the specimen 11 and the stage 10, the subtracted value is about 1 to 4 Kg. Furthermore, the stage 10 is generally supported by an overhanging member having two guides, such as ball guide; however, when the specimen 11 to be examined is very heavy, it is necessary to use a supporting member having three or four guides in order to increase the stiffness thereof and to increase the resistance against vibration.

When the arm 3 and the focusing adjustment 4 are adapted to the foot base 2, it should be taken into consideration that the difference between the length L1s of the arms are made coincident with the difference between the length L4 and L5: the length L4 is determined as a distance between the back surface 4b of the focusing adjustment 4 and an optical axis of the objective 8, and the length L3 is determined as a distance between the front surface 4a of the focusing adjustment 4 and the optical axis of the objective 8.

Since the arm 3 and the focusing adjustment 4 are arranged to be detachable in the microscope apparatus according to employ the invention, it is necessary to uniform mutual mechanical coupling systems and mutual electrical connecting systems arranged between the foot base 2 and the arm 3 and arranged between the foot base 2 and the focusing adjustment 4, and further it is necessary to employ uniform mechanical dimensions of mechanical coupling members and electrical connecting members arranged therebetween.

Figure 2:
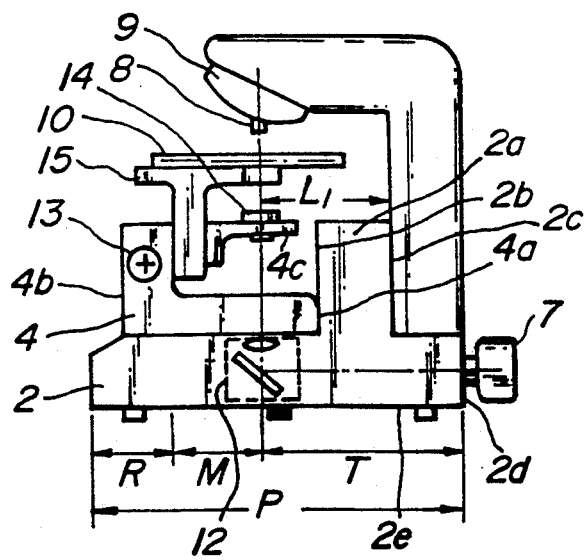
FIG. 2 is a side view depicting a second embodiment of microscope according to the invention.

FIG. 2 is a schematic view illustrating the second embodiment of the microscope according to the invention. In the second embodiment, the stage 10 for use in a specimen having a diameter of 6 inches is adapted; an optical system 12 for introducing a light to the specimen is formed in the foot base 2; therefore, the lamp house 7 is arranged on the rear surface 2d of the foot base 2 and the light illuminated from the light house 7 is introduced to the optical system 12 through an optical path arranged in the foot base 2, being substantially parallel with a bottom surface 2b of the foot base 2. In this embodiment, a different type focusing adjustment 4 is adapted to the foot base 2. The focusing adjustment 4 comprises a knob 13; and the height of the stage 10 can be adjusted by rotating the knob 13. The stage 10 is supported by a stage stand 15, which is provided on the focusing adjustment 4. As is apparent from FIG. 2, the focusing adjustment 4 comprises an extended portion 4c on which a condenser lens 14 is arranged to collect the light emanated from the optical system 12 to the specimen on the stage 10. The focusing adjustment 4 is secured to the foot base 2 by means of pins or screws (not shown); the focusing adjustment 4 is arranged to be possible to change its direction by 180 degrees in a longitudinal direction by rotation of the foot base 2. Further, it may be possible to arrange a power supply and a control unit in the foot base 2; by the control unit, the movements of the focusing adjustment 4 and the revolving nose piece 9, etc. are controlled. In this case, it is necessary to provide connectors in the focusing adjustment 4 and the arm 3 for electrically connecting the focusing adjustment 4 and the revolving nose piece 9 arranged in the arm 3 to the controller. It should be noted that in the microscope illustrated in FIG. 2 there has not been assembled an eyepiece section yet.

In FIG. 2, the length P represents a whole length of the foot base 2; the length M a difference between a distance between the front end portion 4b of the focusing adjustment 4 and the optical axis of the objective lens 8 and a distance between the back end portion 4a of the focusing adjustment 4 and the optical axis of the objective 8; the length T a distance between the back end surface 2a of the foot base 2 and the optical axis; and the length R a difference obtained by subtracting a sum of the lengths M and T from the length P.

In the lamp house 7, a light source unit is arranged, because the lamp house 7 sometimes should be arranged not on the foot base but on the arm 3, for instance, when the arm 3 having a long length L1 is used.

Figure 3A:
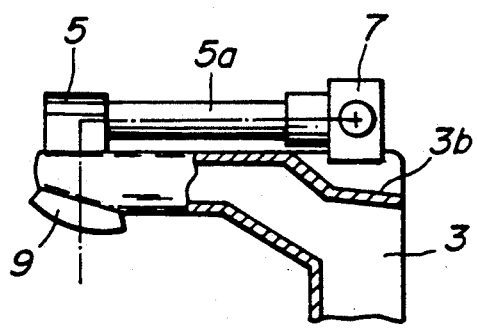
FIGS. 3A and 3B are schematic views illustrating a variation of the microscope according to the invention, in which a back portion of the arm of the microscope is varied.
Figure 3B:
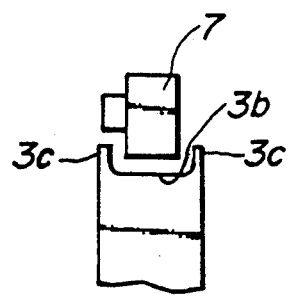

In the reflection type microscope, as shown in FIG. 1, the lamp house 7 is arranged on an upper portion of the arm 3; it is desired to form a concave portion 3b in the back portion of the arm as shown in FIGS. 3A and 3B. In the concave portion 3b, the lamp house 7 is arranged so as to form a space of about 5 to 10 mm between the inner surface of the concave portion 3b and the bottom surface of the lamp house 7 in order to prevent that the heat generated in the lamp house 7 is conducted to the arm 3, as far as possible.

The concave portion 3b also serves to collect dusts generated in the lamp house 7, so that the dust does not fall on the specimen; further, the concave portion 3b serves to prevent that the photosensitive material formed on the specimen is damaged by a leakage of light from the lamp house 7. Furthermore, it is possible to make compact the size of the arm 3 by forming the concave portion 3b in the arm 3. Particularly, in case that it is desired to make short the distance between an optical axis of a light introducing tube 5a and the upper surface of the arm 3, such structure that the concave portion 3a is formed in the back portion of the arm 3 is effective to make the size of the apparatus as a whole, compact.

Figure 4A:
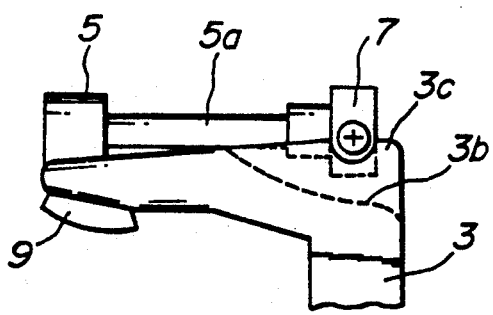
FIGS. 4A and 4B are schematic views representing another variation of the back portion of the arm of the microscope according to the invention.
Figure 4B:
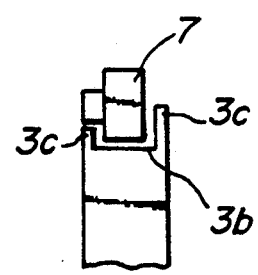

FIGS. 4A and 4B are schematic views showing a variation of the structure of arm 3 shown in FIGS. 3A and 3B. As clear from FIG. 4B, stays 3c formed on the upper portion of the arm 3 is arranged so as to form a tapered shape viewed from sides. In comparison with the construction of arm 3 shown in FIGS. 3A and 3B, the strength of the arm 3 is increased.

FIGS. 5A and 5B are schematic views illustrating the optical system 12 which is arranged in the foot base 2. The optical system 12 constitutes a unit comprising a mirror 17, which is arranged to be inclined by 45 degrees with respect to the optical axis of the objective 8 to introduce the light to the specimen 11, a window lens 18 and a dust proof glass 19. The optical system unit 12 is arranged to be movable in the longitudinal direction of the foot base 2 so as to make coincident the optical axis of the optical system unit 12 and that of the objective 8 arranged in the arm 3. When the arm 3 and the focusing adjustment 4 are adapted to the foot base 2, it should be taken into consideration that the difference between the length L1s of the arms 3, the length M of the focusing adjustment 4 and the moving amount of the optical system unit 12 in the foot base 2 should be coincident with each other.

FIG. 6 is a schematic view depicting a bottom surface 2e of the foot base 2. Rubber dampers 1 are provided in the front and back end portions of the bottom surface in order to absorb vibration; and studs 16 are provided between the front end dampers and the back end dampers in order to give a good balance in weight to the microscope. The studs 16 are arranged to be detachable and thus it is possible to arranged the studs 16 at front arranging portions 20 in accordance with the weights of the focusing adjustment 4 and the arm 3 to be adapted to the foot base 2. Generally, the studs arranging portions 16 or 20 should be selected taking into consideration a center of gravity and a resonance portion of the microscope apparatus as a whole. It may be possible to arrange such that the studs 16 are slidable on the bottom surface of the foot base 2 and fixed at an appropriated portions thereof in accordance with the weight of the apparatus as a whole.

Figure 7:
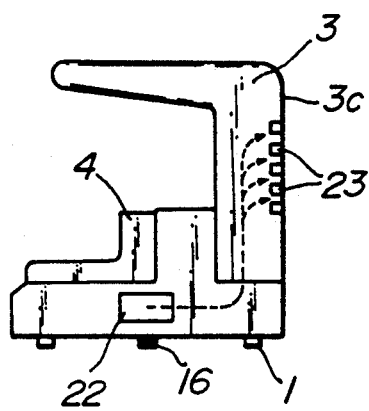
FIG. 7 is a schematic view illustrating a variation of the arm which comprises windows for the exhaust of heat generated by a power supply, etc. equipped in the base of the microscope according to the invention.

On a back surface 3c of the arm 3 are provided windows 23 for the exhaust of heat generated by heat elements as shown in FIG. 7, such as the power supply 22, which is installed in the foot base 2.

Figure 8:
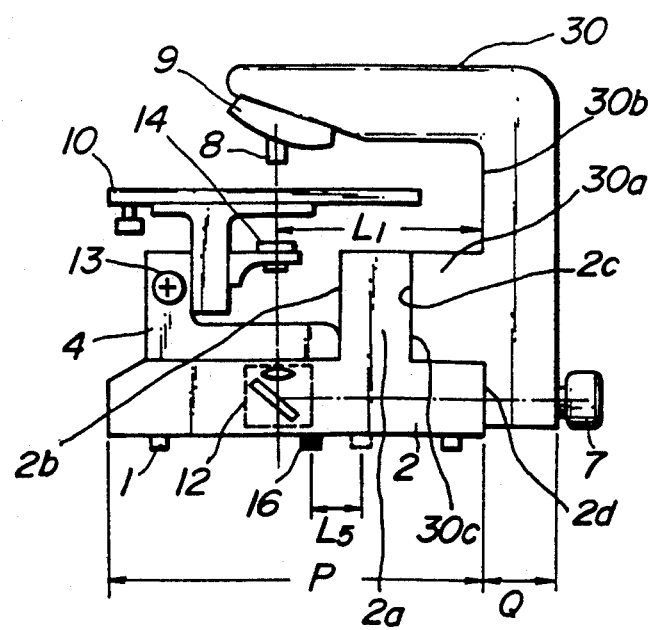
FIG. 8 is a side schematic view representing a third embodiment of the microscope according to the invention.

FIG. 8 shows a third embodiment of the microscope apparatus, which comprises a stage for use in a specimen having a diameter of 8 inches. In comparison with the first and second embodiments shown in FIGS. 1 and 2, for examining the 6 inch specimen, the length L1 of the arm 3 of the third embodiment is 60 mm longer than that of the microscope apparatus according to the first and second embodiments; that is to say, the length M of the apparatus according to the third embodiment is 60 mm. In this embodiment, the same focusing adjustment 4 as that of the apparatus shown in FIG. 2 is used but the arm 30 having a longer length L1 is arranged. In the third embodiment, the back surface 2d of the foot base 2 serves as a standard surface in order to adapt the arm 30 thereto. Although, the arm 30 comprise a projected portion 30a on the inner surface 30b of the stand portion thereof; and the front surface 30c of the projected portion 30a is urged against the back surface of the projected portion 2a of the foot base 2. It should be noted that the operational knob 13 for adjusting the height of the stage 10 is provided in a proximal side of the focusing adjustment 4; therefore, the operator can operate the knob 13 without difficulty even if the stage stroke is large.

As illustrated in FIG. 8, the bottom of the arm 30 is provided at the back end of the foot base 2. Therefore, the stud 16 is arranged to be deviated to the backward direction by the length L5 in order to stabilize the microscope apparatus as a whole in weight. Further, the optical path for introducing the light of the light house 7 into the optical system 12 should be extended to the back end portion of the arm 30 in the longitudinal direction of the foot base 2 by the thickness of the arm 30. It should be noted that the extension of the optical path by about 50-100 mm does not causes a deterioration of the performance of the optical system 12. However, it is necessary to provide mechanical coupling members for coupling the foot base 2 and the arm 30 and electric connecting members for connecting the power supply 22 and light house 7 in the foot base 2 and the arm 30.

Figure 9A:
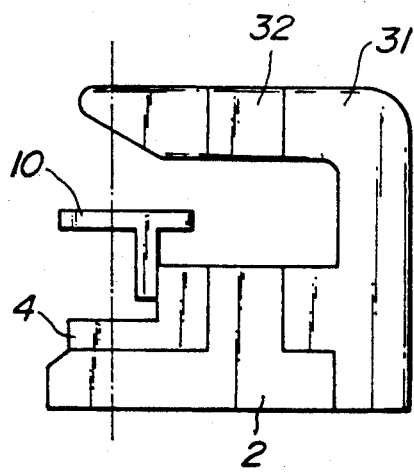
FIGS. 9A and 9B are side schematic views showing variations of the third embodiment represented in FIG. 8.
Figure 9B:
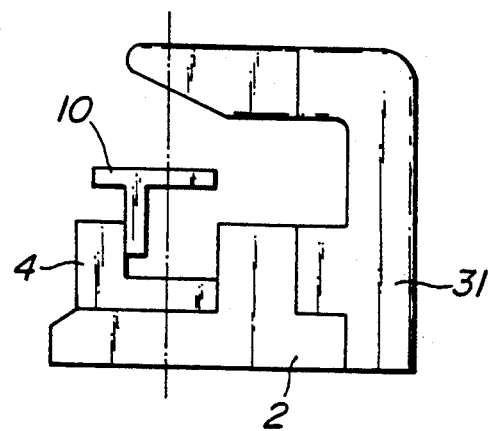
Figure 10:
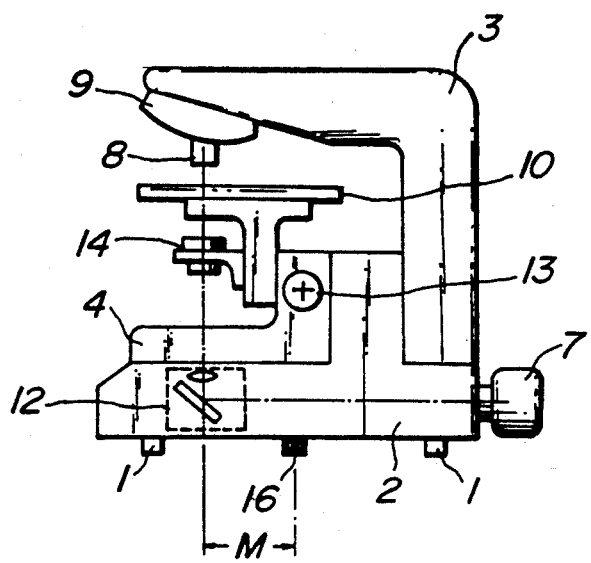
FIG. 10 is a side schematic view depicting another variation of the third embodiment represented in FIG. 8.

In case a large stiffness is not required in the arm, it may be possible to extend the length L1 of the arm 31 by means of a spacer 32 as shown in FIG. 9A. Contacted surfaces of the spacer 32 and the arm 31 may be arranged to be inclined. However, it should be noted that it is required that the extended length of the arm 31 is made coincident with the length M stated in the above. FIG. 9B is a schematic view representing a microscope apparatus in which the spacer 32 is removed and the focusing adjustment 4 is turned by 180 degrees. FIG. 10 is a schematic view showing the apparatus in which the same arm 3 and the same focusing adjustment 4 as those of the second embodiment (shown in FIG. 2) are selectively used, but the focusing adjustment 4 is turned by 180 degrees. Therefore, the optical axis 12 is deviated into the forward direction by the length M in comparison with the position of the optical system 12 in FIG. 2.

Figure 11:
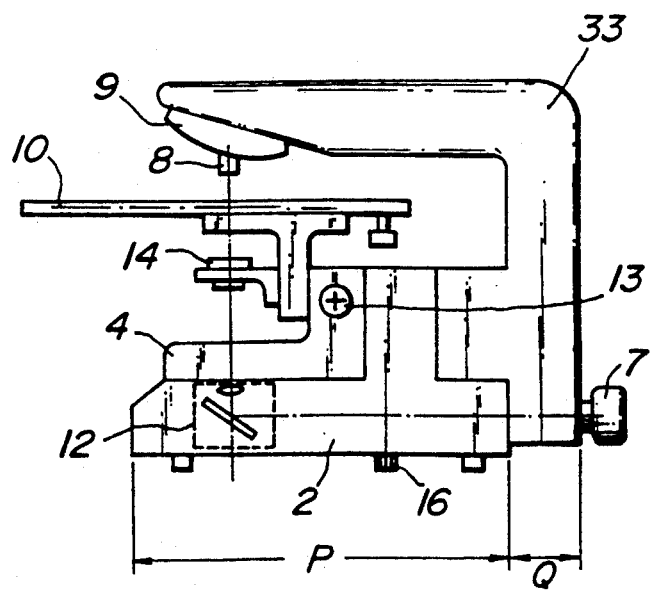
FIG. 11 is a side schematic view illustrating another variation of the third embodiment represented in FIG. 8.

FIG. 11 is a schematic view showing an apparatus in which an arm 33 having a long length L1 is adapted to the foot base 2 but the same focusing adjustment 4 as that of the second embodiment is used.

FIGS. 10 and 11 show an example that specimens having different diameters can be examined in one microscope apparatus by adapting different type arms to the foot base 2. That is to say, in the microscope apparatus shown in FIG. 10, the arm 3 having a short length L1 is adapted and the apparatus as a whole is made compact, but the specimen to be examined has a small diameter of 6 inches. In comparison to this, in the microscope apparatus shown in FIG. 11, the arm 33 having a long length L1 is selectively used and the specimen to be examined has a long diameter of 10 inches. The same focusing adjustment 4 is commonly used in these apparatuses, but the stud 16 is deviated into the backward direction in the apparatus shown in FIG. 11.

As explained in detail in the above, according to the invention, specimens having different dimensions can be examined in one microscope apparatus by preparing different type arms and different type focusing adjustments and by selectively adapting anyone of the arms and anyone of the focusing adjustments in accordance with the diameter of the specimen to be examined. Further, in the conventional microscope apparatus, it was impossible to use an objective having a long working distance. However, in the apparatus according to the invention, an objective having a long working distance can be used by adapting an arm having a large height, so that the operational efficiency is increased and it is possible to examine the specimen with a large field of view.

In such manner, in the apparatus according to the invention, the arm and the focusing adjustment are arranged to be detachable with respect to the foot base, so that it is possible to selectively use the arm and the focusing adjustment in accordance with the length and weight of the specimen to be used. Further, in the invention, the mechanical dimensions of mechanically connecting members provided in the foot base, the adapting arm and the adapting focusing adjustment are uniformed; therefore, the numbers of the adapting members to be prepared can be made minimum.

What is claimed is:

1. A microscope apparatus comprising:
a foot base;
a tube;
a stage for holding a specimen to be examined;
a plurality of arms for alternately and selectively holding said tube, said arms being arranged to be alternately and selectively mounted on said foot base and detachable with respect to said foot base;
a plurality of focusing adjustments for alternately and selectively holding said stage, said focusing adjustments for being alternately detachably mounted on said foot base, each of said focusing adjustments being differently configured and, when mounted on said foot base, being movable relative to said foot base so as to change a direction of a said focusing adjustment by 180° relative to a longitudinal direction of said foot base;
an objective;
an eyepiece arranged on said arm;
an optical system for introducing light into a specimen to be examined;
first supporting means including a first standard surface provided on said foot base for supporting anyone of said arms which is selectively used in accordance with the type of said specimen to be examined, a position of said selectively used arm being determined by said first standard surface; and
second supporting means including a second standard surface provided on said foot base for supporting anyone of said focusing adjustment which is selectively used in accordance with the type of said specimen to be examined, a position of said selectively used focusing adjustment being determined by said second standard surface.

2. A microscope apparatus according to claim 1, wherein:
said arms are different in length L1 which is defined by a distance between an optical axis of the objective held in said tube and an inner surface of a stand portion of said selectively used arm and different in height which is defined by a distance between an upper surface of said foot base and a position where said objective is arranged on the selectively used arm.

3. A microscope apparatus according to claim 2, wherein:
said length L1 of said selectively used arm is varied by means of a spacer.

4. A microscope apparatus according to claim 1, wherein:
said focusing adjustments are different in height and stiffness thereof.

5. A microscope apparatus according to claim 1, wherein:
said foot base comprises a projected portion; and one of side surfaces of the projected portion serves as a first reference surface for determining a first position where said selectively used focusing adjustment is adapted to the foot base and other one of said surfaces serves as a second reference surface for determining a second position where said selectively used arm is adapted to the foot base.

6. A microscope apparatus according to claim 5, wherein:
a back side surface of said foot base also serves as a third reference surface for determining the second position where the selectively used arm is adapted to the foot base.

7. A microscope apparatus according to claim 1, wherein:
said selectively used focusing adjustment is arranged to be able to turn its direction by 180 degrees in a longitudinal direction of said foot base.

8. A microscope apparatus according to claim 1, wherein:
said optical system comprises a light source arranged in a light house and an optical unit, which comprises a mirror for reflecting the light emanated from the light source to introduce the light to the specimen held on the stage.

9. A microscope apparatus according to claim 8, wherein:
said optical system is arranged on said arm.

10. A microscope apparatus according to claim 9, wherein:
said arm comprises a concave portion arranged on said back portion thereof said arm to install said light house therein; said light source is installed in the concaved portion such that a space is formed between a bottom surface of said light house and an upper surface of the arm.

11. A microscope apparatus according to claim 8, wherein;

said optical system is arranged in said foot base and arranged to be movable therein in a longitudinal direction of said foot base.

12. A microscope apparatus according to claim 11, wherein:
said light house is arranged on a rear surface of said foot base and an optical path for introducing a light generated in said light house to said optical system is extended through the foot base in the longitudinal direction thereof.

13. A microscope apparatus according to claim 11, wherein:
said light house is arranged on a rear surface of said arm and an optical path for introducing a light generated in said light house to said optical system is extended through said foot base and the arm in the longitudinal direction of said foot base.

14. A microscope apparatus according to claim 1, wherein:
said foot base comprises shock absorbing members on a bottom surface thereof.

15. A microscope apparatus according to claim 1, wherein:
said foot base comprises stud members on a bottom surface thereof; and arranging portions of said stud members on the bottom surface arranged to be able to be changed in accordance with a weight of the apparatus as a whole.

16. A microscope apparatus according to claim 15, wherein:
said stud members are secured to the bottom surface of said foot base so as to be slidable in a longitudinal direction of said foot base.

17. A microscope apparatus according to claim 1, wherein:
said apparatus further comprises a control unit for controlling a movement of said focusing adjustment and a movement of a said objective provided on said arm and a power supply; and said control unit is arranged in said foot base; and said focusing adjustments, arms and foot base comprises connecting members for mechanically and electrically connecting said focusing adjustments and arms, and said control unit and said power supply; and dimensions of said connecting members are made coincident to each other.

18. A microscope apparatus according to claim 17, wherein:
each of said arm comprises a channel for introducing a hot air heated up by said power supply being formed through said foot base and said arm; and each of said arm comprises a plurality of windows for exhausting said hot air.

* * * * *